H. P. HALL.
Corn-Planters.

No. 158,488. Patented Jan. 5, 1875.

Attest:
W. M. Hatch
O. Rugg

Henry P. Hall
Inventor

# UNITED STATES PATENT OFFICE.

HENRY P. HALL, OF BLOOMINGTON, ILLINOIS.

IMPROVEMENT IN CORN-PLANTERS.

Specification forming part of Letters Patent No. 158,488, dated January 5, 1875; application filed September 12, 1874.

*To all whom it may concern:*

Be it known that I, HENRY P. HALL, of Bloomington, in the county of McLean and State of Illinois, have invented certain new and useful Improvements in Corn-Planters; and I do hereby declare the following to be a full, clear, and exact description thereof, reference being had to the accompanying drawing and to the letters of reference marked thereon.

The nature of my invention consists in the construction and arrangement of a dropping and checking attachment for corn-planters, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
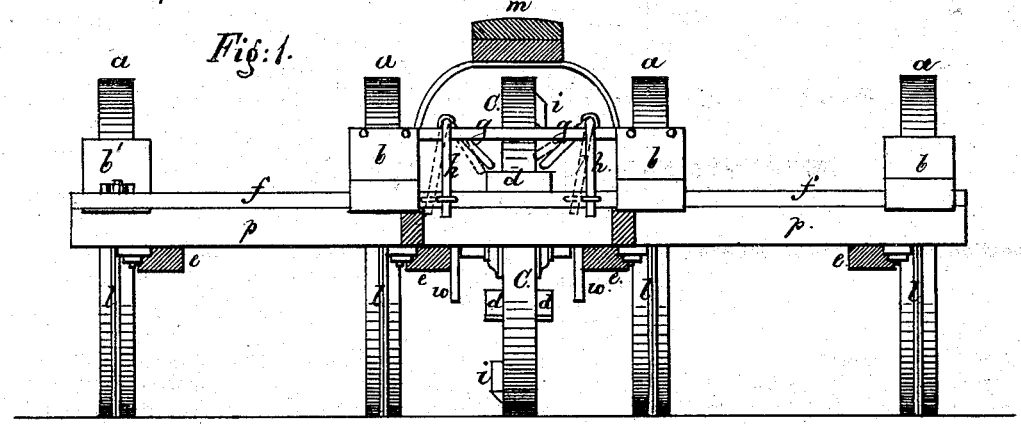
Figure 2:
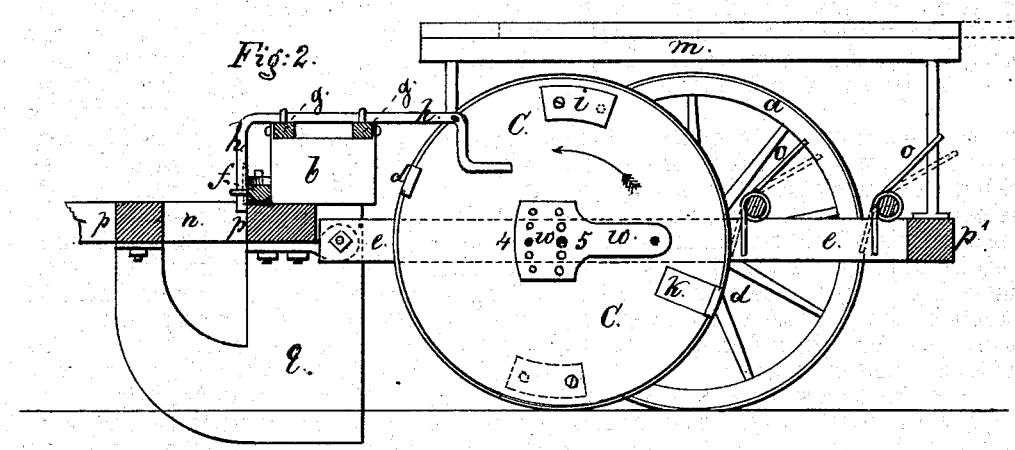
Figure 3:
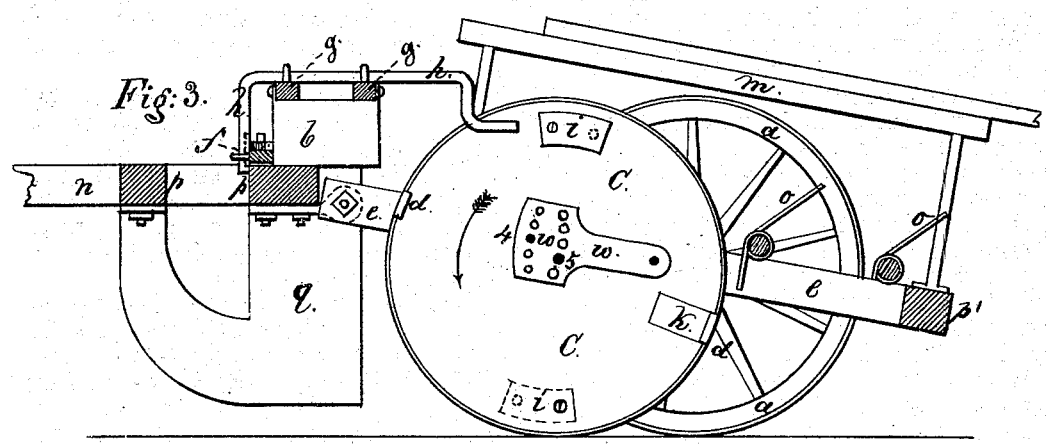

Figure 1 is a front view of a corn-planter embodying my invention. Fig. 2 is a vertical section of the same, taken at the side of the wheel that operates the dropping mechanism, and showing the runners in the ground. Fig. 3 is a similar section, showing the runners thrown up out of the ground.

$p\ n$ represent a suitable frame, upon which are secured four corn-boxes, $b$, and to the under side of the frame are secured corresponding runners $q$, through which the corn is dropped into the ground. $f$ is the dropping-bar, passing through the corn-boxes $b$, and either itself forming the dropping mechanism or operating circular perforated plates in the corn-boxes to drop the corn. The frame $p\ n$ is hinged or pivoted at its rear side to another frame composed of parallel beams $e\ e$, connected at their rear ends by a cross-bar, $p'$. In this frame are mounted four wheels, $a$, placed directly behind the runners $q$, to support the frame and cover the corn dropped. On the inner sides of the two center beams A are secured metal plates $w$, the front ends of which may be adjusted up and down, and these plates are perforated by a number of holes, as shown in Figs. 2 and 3. In the holes on the plates $w$ the axle of a wheel, C, is inserted, which axle may be adjusted up and down in different holes in the plates. To the periphery of the wheel C are attached two markers, $d\ d$, directly opposite each other. Immediately above one of these markers a weight, $k$, is let into and secured to the wheel C, for the purpose of loading the wheel, so that when the frame is raised the wheel will turn to bring that marker down toward the ground. $i\ i$ are cams, attached to opposite sides of the wheel C near the periphery, which cams, as the wheel revolves, operate the dropping mechanism in the following manner: On cross-bars $g\ g$, attached to the two middle corn-boxes $b$, and in suitable bearings on said cross-bars, are placed two shafts, $h\ h$, the front ends of which are bent downward, and attached to the slide $f$ by means of staples or other suitable means. The rear ends of the shafts $h$ form cranks, as shown in Figs. 2 and 3, and said cranks extend one on each side of the wheel C, so as to be turned alternately by the cams $i$ on the sides of said wheel, and by this means the slide is moved back and forth to operate the seed-dropping mechanisms in the corn-boxes. Any desired number of wedges $i$ may be used; but they must always be placed so as to divide the circle of the wheel into equal parts.

The wheel C performs three distinct and separate offices. It regulates the depth of the planting by adjusting the wheel in the plates $w$, and by adjusting said plates. It checks off the ground by means of the markers $d\ d$ in straight rows, so as to plow both ways. It operates the dropping-bar, which causes the corn to drop.

The checking of the rows is done by the markers $d\ d$, and the weight $k$ will bring the markers to the ground at any desired point, so that the impression made by the markers may be in line with each other.

It will be seen that the seat $m$ for the driver is made in two parts, and the top part slides upon the other part; hence, as the front part of the frame is to be raised, the driver, by moving rearward, slides the top part of the seat, and causes his weight to be thrown to the rear. As this is done the cam-wheel is raised from the ground, and, being weighted, the heavy portion will fall near to the ground. This will check the inaccuracies in marking.

This dropping and checking apparatus may be attached to and used with any corn-planter, and to drop as many hills at one time as desired.

Having thus fully described my invention, what I claim as new, and desire to secure by Letters Patent, is—

1. The wheel C, provided with the markers $d\ d$, weight $k$, and cams $i\ i$, and made adjustable in adjustable plates or bearings $w\ w$, attached to a frame connected with a corn-planter, for the purposes herein set forth.

2. The combination of the adjustable weighted marking-wheel C, provided with cams $i\ i$, the crank-shafts $h\ h$, and the sliding bar $f$, which forms or is connected to the dropping mechanism of a corn-planter, substantially as and for the purposes herein set forth.

In testimony that I claim the foregoing I have hereunto set my hand and seal this 4th day of September, 1874.

HENRY P. HALL. [L. S.]

Witnesses:
  W. M. HATCH,
  O. RUGG.